United States Patent [19]

Gupta et al.

[11] Patent Number: 4,805,461
[45] Date of Patent: Feb. 21, 1989

[54] TRANSDUCER AND SYSTEMS FOR HIGH SPEED MEASUREMENT OF SHOCK LOADS

[75] Inventors: Y. M. Gupta; Paul D. Horn, both of Pullman, Wash.

[73] Assignee: Washington State University Research Foundation, Inc., Pullman, Wash.

[21] Appl. No.: 104,204

[22] Filed: Oct. 2, 1987

[51] Int. Cl.$^4$ .................................................. G01L 1/24
[52] U.S. Cl. ................................... 73/800; 250/231 R
[58] Field of Search ............... 73/800, 11, 705, 862.69, 73/862, 115, 505; 250/227, 231 R, 231 P, 225; 356/32, 33, 34, 35, 35.5

[56] References Cited

U.S. PATENT DOCUMENTS

| | | | |
|---|---|---|---|
| 3,213,666 | 10/1965 | Rudnick | 73/11 |
| 4,227,403 | 10/1980 | Dooley et al. | 73/115 |
| 4,270,050 | 5/1981 | Brogardh | 356/32 |
| 4,451,730 | 5/1984 | Brogardh et al. | 250/227 |
| 4,492,121 | 1/1985 | Lehto | 73/705 |
| 4,495,819 | 1/1985 | Tekippe | 73/800 |
| 4,509,370 | 4/1985 | Hirschfeld | 250/227 |
| 4,524,619 | 6/1985 | Staudte | 73/505 |
| 4,581,530 | 4/1986 | Brogardh et al. | 250/231 R |
| 4,612,810 | 10/1986 | Martens | 73/705 |
| 4,708,494 | 11/1987 | Klenerman | 250/231 R |

OTHER PUBLICATIONS

Mao, H. K. et al., "Specific Volume Measurements of Cu, Mo, Pd, and Ag and Calibration of the Ruby $R_1$ Fluorescence Pressure Gauge from 0.06 to 1 Mbar", *Journal of Applied Physics*, (Jun., 1978).

Richard A. Forman et al., "Pressure Measurement Made by the Utilization of Ruby Sharp-Line Luminescence", *Science*, vol. 176, (Apr., 1972).

P. D. Horn et al., "Wavelength Shift of the Ruby Luminescence R Lines Under Shock Compression", *Applied Physics Letters*, No. 49(14), (Oct. 6, 1986).

*Primary Examiner*—Stewart J. Levy
*Assistant Examiner*—Robert R. Raevis
*Attorney, Agent, or Firm*—Wells, St. John & Roberts

[57] ABSTRACT

A transducer and system for optically indicating the level of stress experienced during loading. The system is designed for use in shock loading conditions. The transducer uses a transducer piece made from a crystalline luminescent material such as ruby. The transducer piece is preferably positioned between one or two support pieces, preferably along flat faces to create a uniform stress field within a limited detection area. The system uses the luminescent output from the detection area to produce a spectral output with time using a spectrometer and streak camera. The streak camera output is advantageously converted to digital signals for storage and analysis.

37 Claims, 4 Drawing Sheets

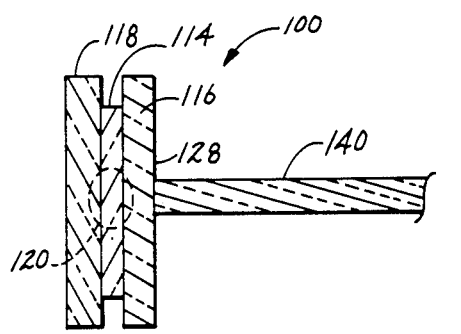
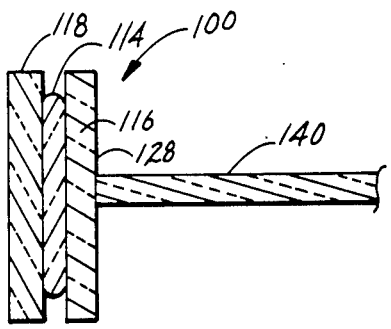
FIG 4
FIG 5
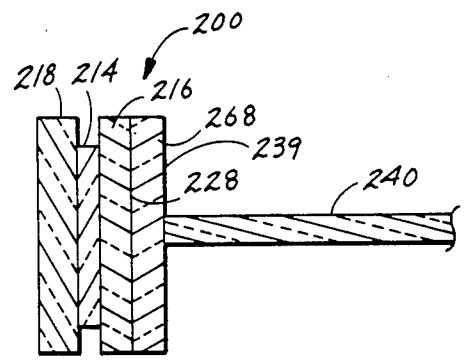
FIG 6
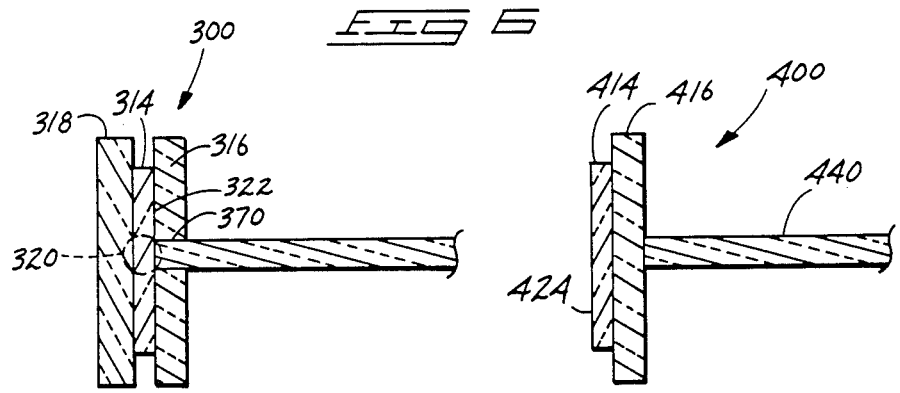
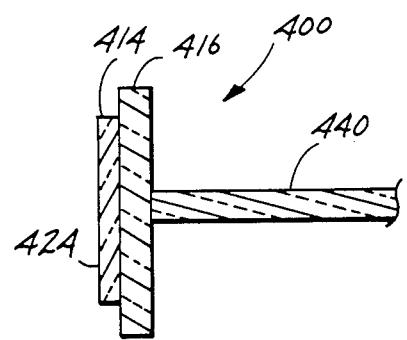
FIG 7
FIG 8

TRANSDUCER AND SYSTEMS FOR HIGH SPEED MEASUREMENT OF SHOCK LOADS

TECHNICAL FIELD

The present invention relates to methods and apparatus for optically measuring internal stress during high speed or shock loading using luminescent materials which exhibit a frequency shift in luminescent output as a function of stress.

BACKGROUND OF THE INVENTION

Transducers can be employed which utilize optics to provide force or stress measurements. For example, U.S. Pat. No. 4,492,121 to Lehto discloses the use of optics for measuring underwater pressures from explosions. The lehto device employs a piece of ruby, which is bonded to the end of an optical fiber. The ruby is stimulated by a laser to produce a luminescent output. Exposure of the ruby to an underwater explosion allegedly produces a shift in luminescent output frequency as a function of the applied pressure.

Unfortunately, the Lehto device is restricted to measuring isotropic pressures, such as experienced underwater or in other fluid environments. The Lehto device does not allow stress determination under other states of stress, such as uniaxial, biaxial, or complex states involving shear, compressive or tensile stresses in combination.

Accordingly, there remains a need for systems which can reliably produce an indication of stress when subjected to nonisotropic high speed loading with large magnitude stresses.

BRIEF DESCRIPTION OF THE DRAWINGS

Preferred embodiments of the invention are illustrated in the accompanying drawings, in which:

FIG. 4 is a cross-sectional view of an alternate embodiment optical stress transducer assembly;

FIG. 5 is a cross-sectional view of the transducer assembly of FIG. 4 shown in a highly stressed condition, which is exaggerated for purposes of illustration;

FIG. 6 is a cross-sectional view of another alternate embodiment optical stress transducer assembly in accordance with the invention;

FIG. 7 is a cross-sectional view of yet another alternate embodiment optical stress transducer assembly in accordance with the invention;

FIG. 8 is a cross-sectional view of still a further alternate embodiment optical stress transducer assembly in accordance with the invention;

DETAILED DESCRIPTION OF THE PREFERRED EMBODIMENT

The following disclosure of the invention is submitted in compliance with the constitutional purpose of the Patent Laws "to promote the progress of science and useful arts" (Article 1, Section 8).

Figure 3:
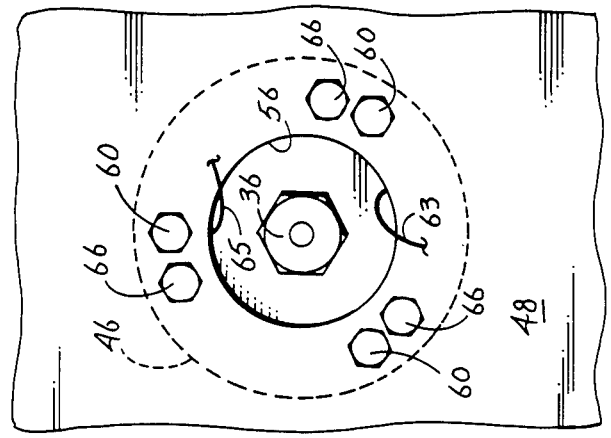
FIG. 3 is a rear view of the assembly shown in FIG. 1.
Figure 2:
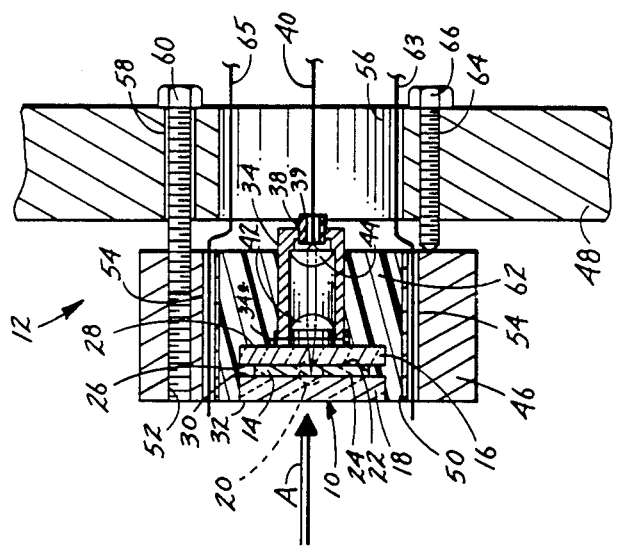
FIG. 2 is a cross-sectional view taken along lines 2—2 in FIG. 1.
Figure 1:
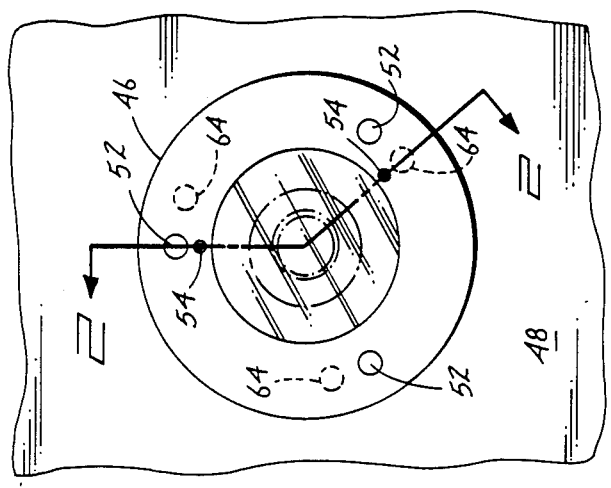
FIG. 1 is a front view of an optical stress transducer mounted within an adjustable transducer mounting assembly in accordance with the invention.

FIGS. 1-3 illustrate an optical stress transducer 10 and adjustable transducer mounting assembly 12. Such an apparatus is designed for use in analyzing high stresses applied at high loading rates within a very short time frame, such as in less than one microsecond. This apparatus is designed to indicate stress developed as a result of shock loading applied by an impacting object (not shown), which travels toward the transducer as shown inFIG. 2 by the arrow marked A.

Transducer 10 includes a transducer piece 14 which is sandwiched between first and second support pieces 16 and 18 respectively. Transducer piece 14 is made of a crystalline luminescent material which exhibits a frequency shift in luminescent output as a function of stress. A preferred material is ruby. Ruby is aluminum oxide ($Al_2O_3$) which also includes chromium ions ($Al_2O_3:Cr$). Other crystalline materials which also include chromium or other luminescing ions supported in a crystalline matrix may also be acceptable, such as magnesium oxide and chromium ($MgO:Cr$).

Transducer piece 14 is illustrated in the form of a thin circular disk having first and second lateral faces 22, 24 respectively, which are substantially flat and parallel to one another. Faces 22, 24 define a disk thickness which is substantially uniform across the disk faces. Each face is adapted to receive an approximately uniform stress by applying opposing forces in directions perpendicular to the faces. The optical transducer allows analysis of the stress within the transducer piece generated by such forces. The application of force produces a relatively uniform compressive state of stress across the disk. Other orientations and states of stress can also be applied to transducer 10 without departing from the principles and scope of the invention.

Transducer piece 14 includes and utilizes a localized detection area 20 advantageously formed about a central axis extending laterally through transducer piece 14. Detection area 20 is excited by laser light before and during high stress conditions. The detection area is preferably comprised of a single crystal of luminescent material. The single crystal provides for a relatively homogeneous crystal lattice which is also uniformly exposed to a nearly uniform state of stress. Although a single crystal is preferred, other homogeneous crystal structure may also provide a relatively coherent luminescent response thereby allowing use in this invention.

The minimum lateral dimension across faces 22, 24 is preferably great enough to prevent a strain rarefaction wave, which propagates inwardly from the outer edges of transducer piece during high stress conditions, from reaching detection area 20 within a resolution period sufficient for information indicating stress to be detected without distortion. Such a minimum lateral dimension should be at least three times the thickness dimension. In the more preferred embodiments, the lateral dimension is more than five (5) times the thickness dimension. In the most preferred embodiments the minimum lateral dimension is more than ten (10) times the thickness dimension.

A reflective coating (not shown) is also preferably vapor deposited onto second lateral face 24 of transducer piece 14. This reflective coating acts as a mirror for enhancing both laser stimulation and collection of luminescence in and from detection area 20. A preferred material for the reflective coating is aluminum because of its relatively good reflectance for both the laser light and the luminescent output from ruby.

First and second support pieces 16, 18 which provide support to transducer piece 14 during testing are also disk-shaped and preferably larger than transducer piece 14 in diameter or other lateral size. First support piece 16 includes substantially flat and parallel inner and outer faces 26, 28 respectively. Second support 18 also includes substantially flat and parallel inner and outer faces 30, 32. Inner faces 26, 30 of first and second support pieces 16, 18 respectively, are positioned adjacent to first and second faces 22, 24 of transducer piece 14, respectively. In this manner, the inner faces of the first and second support pieces engage the transducer piece in parallel planes in order to develop an approximately uniform stress field over the first and second faces of the transducer piece as a result of an applied load. The detection region 20 in particular will experience a relatively uniform stress field therewithin, thus providing a relatively uniform strain. This is important in producing a unified effect on the luminescence of the transducer piece which is manifested in a shift in frequency of the luminescent output. This detection region must be contrasted with prior art devices which did not provide uniform crystallographic and stress application thus causing variously oriented crystal lattices to experience different states of stress and therefore provide unintelligible mixed and interfering output frequency shifts except when loaded isotropically, as in the hydrostatic loading situations employed exclusively in the prior art.

The first and second support pieces 16, 18 are both preferably constructed of a material of approximately the same mechanical properties as the transducer piece. When the transducer piece is comprised of ruby, the first and second support pieces are preferably comprised of sapphire, another form of $Al_2O_3$ without the luminescing chromium ion. Constructing first support piece 16 of a material similar to transducer piece 14 provides the advantage of mechanical impedance matching between the interface of first surface 22 of transducer piece 14 and inner face 26 of first support piece 16. This mechanical impedance matching minimizes reflectance of the stress or shock wave as it propagates across the transducer piece 14 and into the first support piece 16. This helps to maintain the state of stress within the detection zone in a relatively uniform condition during the brief period during which impact measurements are taken.

Transducer piece 14 is specifically positioned between first and second support pieces 16, 18 in a predetermined orientation relative to the applied force which produces the stress being analyzed. Transducer piece 14 is also placed in a known orientation with respect to the support pieces since the forces act therethrough and uniform stress field development is needed. Such orientation preferably places a principal crystallographic axis of the crystalline material within detection area 20 in a direction normal to first and second faces 22, 24 of transducer piece 14. For example, the crystalline transducer piece disk can be Z cut to place the C axis of the ruby crystal in an orientation orthogonal to first and second faces 22, 24 of transducer piece 14.

Transducer piece 14 and first and second support pieces 16, 18 can be assembled and retained relative to one another using a suitable epoxy cement (not shown) between the surface interfaces. Such an epoxy preferably has very low viscosity to produce a very thin bonding layer, preferably less than 0.0001 inch (0.0025 millimeters). Suitable adhesives need also be relatively transparent to both the laser or other stimulating light and to the spectra of the luminescent output. An adhesive which acoustically matches the transducer piece with the first support piece is also desired to prevent shock wave reflectance. An example of a usable epoxy is Epon brand type 815. The adhesive bonding of the support pieces to the transducer piece facilitates movement of the stress wave for efficient passage through second support piece 18 to transducer piece 14 and on to first support piece 16 without substantial distortion or reflection of the stress wave. Alternatively, no epoxy or other bonding agent need be employed. Under such condition, first and second support pieces 16, 18 and transducer piece 14 are positioned in close relationship to one another.

Transducer 10 also advantageously includes a hollow lens tube 34 which extends rearwardly from the central portion of outer face 28 of first support piece 16. Tube 34 is preferably constructed so that the axial position is adjustable for focusing the laser beam onto the detection area 20. This is advantageously accomplished using a threaded ring 34a which is received on the transducer end of the tube. Tube 34 includes a central opening 38 which is preferably threaded. The opening receives a threaded splice bushing 39 which adjustably supports an optical wave guide, such as optical fiber 40. Optical fiber 40 extends to the internal portion of tube 34 and is adjustable to properly focus the beam emitted from the fiber with respect to lens 44. Lens tube 34 mounts a lens assembly which includes a pair of opposing plano-convex lenses 42, 44. The lens tube and lens assembly are interposed between an end of optical fiber 40 and outer face 28 of first support piece 16 for focusing laser light on transducer piece 14 to define detection area or zone 20. The lens assembly is employed to define a smaller localized detection area than would be obtained were laser light emitting directly from the end of optical fiber 40 and allowed to disburse in travelling to detection area 20.

An adjustable transducer mounting assembly 12 is preferably used to positionally support transducer 10 for application of loading forces and for optical analysis of stress within the detection zone or zones of transducer piece 14. Adjustable transducer mounting assembly 12 comprises a means for retaining the transducer piece and first and second support pieces in an assembled condition for testing. Assembly 12 is comprised of a ring 46 which supports the transducer assembly and which is supported relative to a base 48. Ring assembly 46 includes a central opening 50 and three threaded holes 52 which are preferably equilaterally spaced about the ring for receiving bolts 60 therein. Additionally, two tripping electrode passageways 54 are included through ring 46 for reasons more fully described below.

Optical stress transducer 10 is advantageously retained within center opening 50 of ring 46 using a filler or mounting material 62, such as a suitable epoxy adhesive. Embedding transducer 10 within opening 50 is achieved by first placing ring assembly 46 upon a flat surface with the impact direction 'A' end down. Thereafter, transducer assembly 10 is inserted into opening 50 such that outer face 32 of second support piece 18 is flush with the impact direction end of ring assembly 46. Epoxy is then filled within the remaining void of central opening 50 and permitted to harden. The epoxy used is preferably dimensionally stable to minimize shrinkage expansion and contraction to prevent any movement or forces from being induced against the transducer. A usable epoxy is Epon brand type 332.

Base 48 also has a central opening 56 and three holes 58 formed through the base which are equally spaced about central opening 56. The position of holes 58 corresponds to align with holes 52 in ring assembly 46. Holes 58 in base 48 slidably receive threaded restrainment bolts 60. Bolts 60 threadingly extend into holes 52 of ring assembly 46 to restrain the transducer assembly from extending beyond a desired distance from base 48. A series of threaded holes 64 are also formed in base 48 and are advantageously spaced at equilateral positions about opening 56. Each is most preferably positioned adjacent one of holes 58. Holes 64 threadingly receive outwardly thrusting bolts 66 which bear against the back face of ring assembly 46 to securely position the ring by pushing outward against the restraint of bolts 60. Such an assembly provides an adjustable transducer mount for angularly orienting the flat faces of transducer 10 at a desired 90 degrees relative to the direction of impacting force 'A'. This structure allows very precise adjustment with minimum travel or play.

A pair of insulated electrode wires 63, 65 extend through opening 56 in base 48 and through electrode passageways 54 to a position beyond the outer or contact end face of ring assembly 46. The exposed ends of the electrodes are not insulated. They extend from the face of the transducer to activate a recording system (shown in FIG. 9) when the electrode wires are shorted across by an electrically conductive projectile (98 in FIG. 9) just prior to the projectile striking transducer assembly 10. The projectile is preferably constructed of metal and has an impactor mounted thereon (not shown). The impactor has an impacting face which is preferably made entirely of sapphire coated with an electrically conductive outer surface such as from aluminum. Alternatively, a conductive ring sized to contact electrodes 63, 65 can be included on the impact face with a sapphire inset for contacting the transducer. Other impacting projectiles or contact interface structures are also possible.

FIGS. 4 and 5 illustrate an alternate embodiment optical stress transducer 100 having a transducer piece 114, first support piece 116 and second support piece 118 similar to pieces 14, 16 and 18 described above. In such transducer, an optical fiber 140 is directly connected to outer face 128 of the first support piece 116. Such a construction produces stimulation of a larger detection area 120 than area 20 in transducer 10 due to light disbursing from the end of optical fiber 140 outwardly as it travels through the first support piece.

FIG. 5 illustrates transducer piece 114 under high stress conditions which are illustrated in an exaggerated manner. FIG. 5 shows lateral strain which results from impact loading of the transducer piece 114. The transducer piece is compressed by the impact loading and the induced lateral strain causes bulging of transducer piece 114 at its edges, as shown. This induced lateral strain causes a strain rarefaction wave to progress through the transducer piece from the lateral or outer edges inwardly. The induced strain rarefaction wave thus effects the state of stress within detection area 120 after it has had sufficient time to propagate inwardly. Preferred embodiments of this invention perform measuring of the detection area before the induced strain wave impinges upon the detection area, thus maintaining a relatively uniform state of stress resulting primarily from the applied load and not internal reactions.

FIG. 6 illustrates another alternate embodiment transducer 200. Transducer 200 includes a transducer piece 214 and supporting first and second pieces 216 and 218 similar to transducer 10 described above. Transducer 200 further includes a backup piece or disk 268 which is placed on the outside of first support piece 216. Backup disk 268 is preferably positioned against first support piece 216, or alternatively it can be adhered to the outer face 228 of first support 216 using a thin layer of epoxy such as described above. The adhesive should minimize reflection of stress waves at the interface between disk 268 and first support 216. Optical fiber 240 is positioned adjacent to the outer face 239 of disk 268. The backup disk can advantageously be made of silica.

The backup disk functions by providing additionally elasticity or stress relief during impact of an object against the transducer. The stress relief allows the shock wave generated by impact to progress through the first support piece and backup disk and then be partially reflected at the outer face of the backup piece, to once again subject the transducer piece to a secondary stress wave. This allows easier calibration of the transducer since data is collected for both the primary and secondary (reflected) stress waves.

FIG. 7 illustrates yet another alternate embodiment optical stress transducer 300 having transducer and support pieces 314, 316 and 318 similar to 14, 16 and 18 described above. Transducer 300 also includes a central aperture 370 which extends through first support piece 316. An optical fiber 340 extends through such aperture to contact or nearly contact the first face 322 of transducer piece 314. Such a construction provides a detection area 320 which is smaller than the detection area 120 obtained in transducer 100 where the optical fiber terminates at the outer face of the first support piece.

FIG. 8 illustrates yet another optical stress transducer 400. Such a transducer is comprised of a transducer piece 414, first support piece 416, and an optical fiber 440, similar to pieces 14, 16 and 40 described above. In such transducer, second face 424 of transducer piece 414 receives the impact from a projectile or other applied force against the transducer. The absence of a second support piece is compensatd for by careful alignment of the transducer for precisely orthogonal impact by the projectile (not shown) used to create the shock loading. This mode is not preferred in most applications but is operable in laboratory testing.

Figure 9:
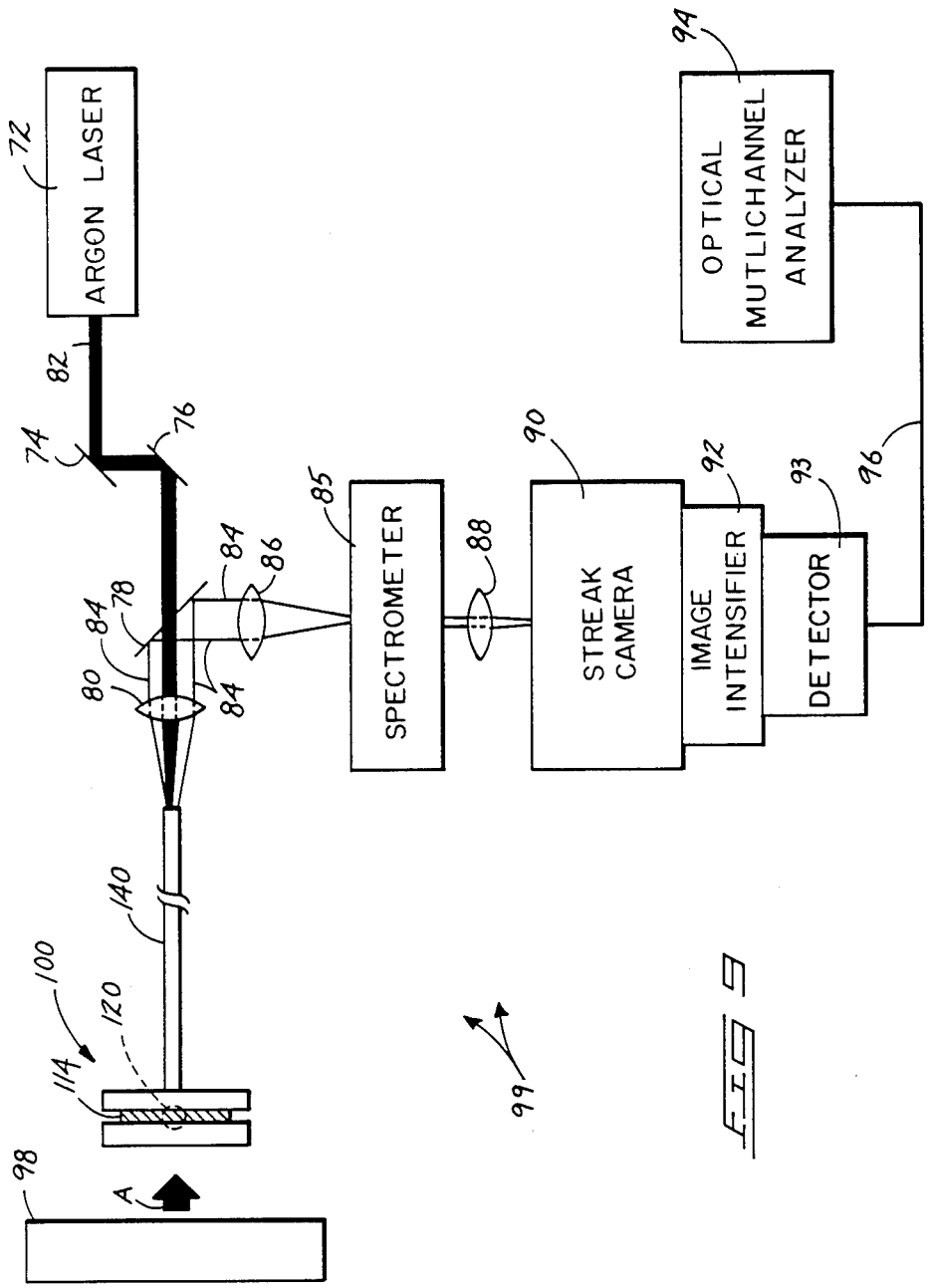
FIG. 9 is a diagrammatic view of a system for use in measuring high stresses applied at high loading rates with a time resolution of at least one microsecond.
Figure 10:
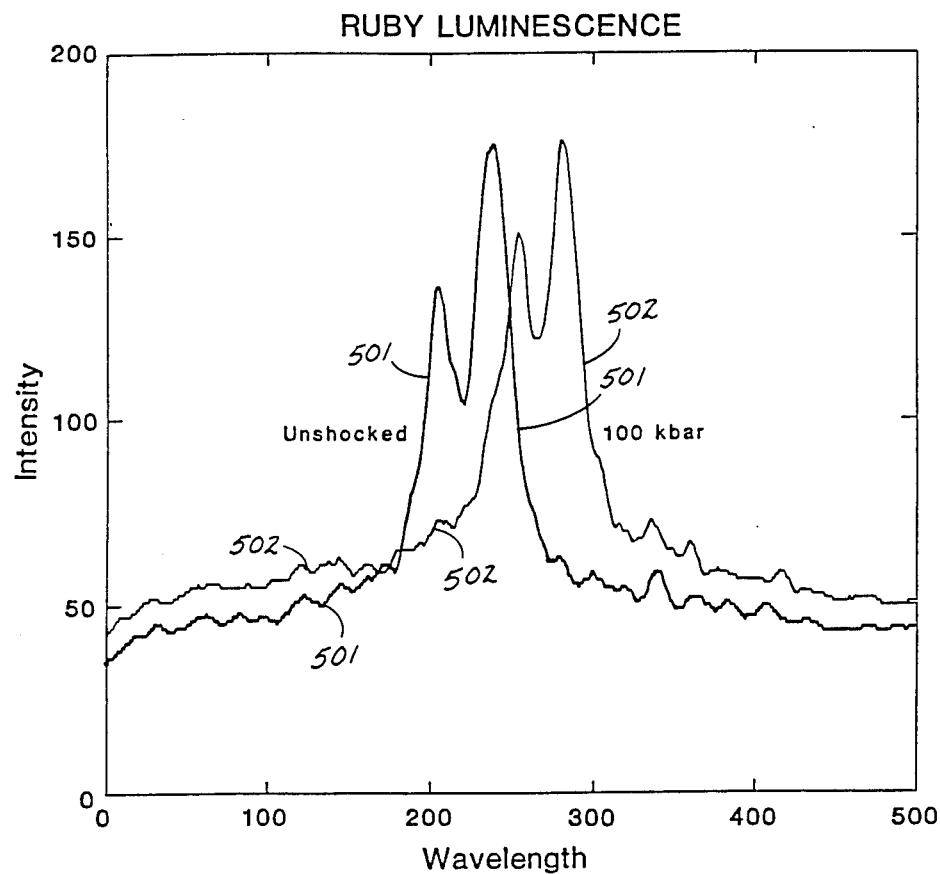
FIG. 10 is a graph illustrating luminescent output intensity for a range of relevant frequencies, as produced by a transducer of this invention under unloaded and shock loaded states employing the system of FIG. 9.

FIG. 9 diagrammatically illustrates a stress measurement system 99 employing an optical stress transducer, such as transducer 100, for use in measuring high stresses applied at high loading rates with a time resolution of at least one microsecond. Such a system includes a stimulating beam source such as an argon laser 72 (Coherent Innova Model 90-6 with a 514.5 nm output). The stimulating beam is optically communicated to detection area 120 of transducer piece 114 by a suitable stimulating beam communication means. As shown, system 99 includes two reflectors 74 and 76 which direct stimulating beam 82 through a dichroic mirror 78 and onto a focusing lens 80. Lens 80 focuses the beam onto the distal end of optical fiber 140 which acts as a wave guide carrying the beam to the transducer assembly 100. The beam emits from the proximate end of optical fiber 140 to stimulate the detection zone 120 producing a luminescent emission, having a frequency spectrum such as shown in FIG. 10.

Optical fiber 140 is preferably employed to transmit both laser light to and the luminescent emissions from detection area 120 in order to optimize the generation and collection of luminescence. Luminscent discharge or output from detection area 120 (diagrammatically indicated by 84) is emitted from optical fiber 140, through lens 80 and onto dichroic beam splitter 78. Dichroic beam splitter 78 allows laser light 82 to propagate therethrough but reflects the luminescent discharge beam 84. The split luminescent discharge 84 is focused by lens 86 directly into the entrance slit of a double spectrometer 85, such as a Spex model 1680 having 1200 groove/mm gratings. Spectrally disbursed luminescence from spectrometer 85 is then focused by a lens 88 onto the cathode of an electronic streak camera 90, such as Imacon model 790.

Streak camera 90 is optically coupled to an image intensifier 92, such as ITT model F4113, which uses a blue P-11 phosphor. An optical output from image intensifier 92 is coupled to a suitable detector 93 such as E G & G brand Vidicon detector, model 1254. The Vidicon detector produces a electronic video output signal indicating intensity as a function of the frequency of the luminescent output. The Vidicon detector is preferably coupled to intensifier 92 by a tapered fiber optic bundle (not shown). Connecting intensifier 92 to detector 93 using the tapered fiber optic bundle has the advantage of providing 10 to 30 times more light throughput than would be obtainable using an equivalent lens system.

The electronic output from optical detector 93 is conducted by cable 96 to an optical multi-channel analyzer 94 which transforms the video signal into digital form, stores the data and allows analysis thereof. A preferred opticalmulti-channel analyzer is the E G & G brand, model 1460 OMA. The streak camera, intensifier, fiber optic bundle, detector and optical multi-channel analyzer comprise a high speed, time resolving recording means for recording the spectrally disbursed luminescent discharge from the luminescent transducer piece with a time resolution of at least one microsecond. A typical shock experiment of a stiff material has a duration of approximately 1 to 2 microseconds. Accordingly, a resolution in the nanosecond range is desirable. The described measuring and recording system is capable of resolving a spectral reading every 30 nanoseconds.

To use such a transducer and system, projectile 98 is fired at the transducer. Electrode sensors adjacent the outer face of the second support piece activate the streak camera immediately preceding impact thus recording multiple luminescent spectra from the crystal as a result of the impact. The laser beam is preferably used a minimum of time to prevent heat generation and thermal stresses. The spectra from spectrometer 85 are disbursed over the phosphor screen of the streak camera thus providing glimpses of the luminescent output at 30 nanosecond or other appropriate interval as determined by the streak camera and its operational parameters. Image intensifier 92 amplifies the streak camera output but necessarily introduces signal noise and it may be desirable to omit such a device in certain systems. The detector and optical multichannel analyzer provide optical to electronic conversion of the data for easier storage and analysis.

The transducers described above can also be used by placing the contact surfaces of the transducers, such as outer face 32 or 424 in intimate contact with an object through which a stress or shock wave will pass. The particular means for mechanically coupling the transducer contact face will vary depending upon the application. Adhesive mounting or simply intimate mechanical contact are both acceptable in many cases. The contact must provide sufficient mechanical coupling so that substantial transmission of the stress wave occurs from the sample into the transducer. Although it is desirable to impedance match the sample with the transducer, such is not possible in many cases. Adjustment in the measured stress in the transducer is made to compensate for the impedance mismatch by calibrating the device against the same or similar sample materials.

FIG. 10 is a graph of two spectral records developed by a system such as described above. One curve marked 501 shows the luminescent spectrum in an unstressed state. The other curve marked 502 shows the transducer output during impact wherein a 100 kilobar (10 gigapascals) stress is developed. The transducer piece employed for such experiment was a single disk shaped crystal of ruby containing 0.5 percent chromium by weight. The transducer piece was approximately 0.120 millimeters thick and 19 millimeters in diameter. The ruby was Z-cut with the crystal C-axis being positioned orthogonal to the transducer piece faces and the surface of the propagating stress wave. The C-axis is thus aligned with the direction of impact and the direction of travel of the stress wave.

Methods according to this invention involve stimulating a relatively homogeneous or single luminescent crystal structure within a limited detection zone, such as by using an optical laser beam. The crystal structure is preferably constructed and supported so as to develop a relatively uniform state of stress within the detection zone. The luminescent output from the detection zone is communicated to a measuring system which spectrally disperses the luminescent output and records the intensity thereof for various relevant frequencies emitted.

The method further involves taking such spectral information both before impact or loading and during loading. The multiple spectral readings provide a chronological record of the stress developed during impact.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. An optical stress transducer for use in measuring high stresses applied at high loading rates with a time resolution of at least one microsecond, and having the ability to discern stress from nonhydrostatically applied loads, the transducer comprising:

a transducer piece made of a luminescent crystalline material that exhibits a frequency shift in luminescent output as a function of stress, the transducer piece substantially comprising a single crystal within a detection area, said transducer piece being specifically positioned in a known orientation relative to the direction of at least one applied force;

the transducer piece having first and second faces which are substantially flat and parallel and adapted to receive applied force, the faces being separated by a thickness dimension which is substantially uniform over the faces of the transducer piece; the transducer piece also having at least one minimum lateral dimension which defines a minimum width across the faces of the transducer piece; said minimum lateral dimension being sufficient so that a strain rarefaction wave which propagates inwardly from an outer edge of the transducer piece during high stress conditions, does not reach the detection area of the transducer piece within a time period sufficient for information indicating stress to be detected from said detection area;

a first support piece having an inner face which is substantially flat and engages the transducer piece to apply an approximately uniform stress over the first face of the transducer piece; and a second support piece having an inner face which is substantially flat and engages the transducer piece to apply an approximately uniform stress over the second face of the transducer piece.

2. The optical stress transducer of claim 1 wherein the first and second support pieces each have outer faces which are substantially flat and parallel to said transducer piece faces.

3. The optical stress transducer of claim 1 further comprising means for beaming a stimulating beam of laser light onto said detection area of the transducer piece.

4. The optical stress transducer of claim 3 wherein said means for beaming includes an optical fiber.

5. The optical stress transducer of claim 4 further comprising:

lens means interposed between an end of the optical fiber and an outer face of the first support piece for focusing laser light onto said detection area of the transducer piece.

6. The optical stress transducer of claim 4 wherein said optical fiber extends through an aperture in one of said support pieces adjacent to said detection area.

7. The optical stress transducer of claim 1 wherein the minimum lateral dimension is at least three times said thickness dimension.

8. The optical stress transducer of claim 1 further comprising retaining means for retaining said transducer piece and said first and second support pieces in an assembly.

9. The optical stress transducer of claim 8 wherein the retaining means is adjustable for enabling precise alignment of the transducer piece relative to a direction of applied force.

10. The optical stress transducer of claim 1 wherein the transducer piece is disk shaped.

11. The optical stress transducer of claim 10 wherein the first and second support pieces are disk shaped.

12. The optical stress transducer of claim 1 wherein the transducer piece and the first and second support pieces are assembled together with the inner faces of the first and second support pieces being adjacent to the first and second faces of the transducer piece, respectively.

13. The optical stress transducer of claim 12 wherein the transducer piece and the support pieces are disk shaped with the inner faces of the support pieces being at least as large as the faces of the transducer piece.

14. The optical stress transducer of claim 13 wherein the detection area is located about a central axis of the disk-shaped transducer piece, and wherein the minimum lateral dimension is at least three times said thickness dimension.

15. The optical stress transducer of claim 1 wherein a principal crystallographic axis of the single crystal within the detection area is oriented normal to the first and second faces of the transducer piece.

16. The optical stress transducer of claim 15 wherein the single crystal is Z-cut and the C-axis of the crystal is orthogonal to the first and second faces of the transducer piece.

17. The optical stress transducer of claim 1 further comprising:

a backup disk positioned against an outer surface of the first support piece.

18. An optical stress transducer for use in measuring high stresses applied at high loading rates with a time resolution of at least one microsecond, and having the ability to discern stress from nonhydrostatically applied loads, the transducer comprising:

a transducer piece made of a luminescent crystalline material that exhibits a frequency shift in luminescent output as a function of stress, the transducer piece substantially comprising a single crystal within a detection area, said transducer piece being specifically positioned in a predetermined orientation relative to the direction of at least one applied force; the transducer piece having first and second faces which are substantially flat and parallel and adapted to receive applied force, the faces being separated by a thickness dimension which is substantially uniform over the faces of the transducer piece; the transducer piece also having at least one minimum lateral dimension which defines a minimum width across the faces of the transducer piece; said minimum lateral dimension being sufficient so that a strain rarefaction wave which propagates inwardly from an outer edge of the transducer piece during high stress conditions, does not reach the detection area of the transducer piece within a time period sufficient for information indicating stress to be detected from said detection area; and a first support piece having an inner face which is substantially flat and engages the transducer piece to apply an approximately uniform stress over the first face of the transducer piece.

19. The optical stress transducer of claim 18 wherein the first support piece has an outer face which is substantially flat and parallel to said transducer piece faces.

20. The optical stress transducer of claim 18 wherein the minimum lateral dimension is at least three times said thickness dimension.

21. The optical stress transducer of claim 18 wherein the transducer piece and the first support piece are assembled together with the inner face of the first support piece being adjacent to the first face of the transducer piece.

22. The optical stress transducer of claim 18 wherein a principal crystallographic axis of the single crystal within the detection area is oriented normal to the first and second faces of the transducer piece.

23. The optical stress transducer of claim 18 wherein the single crystal is Z-cut and the C-axis of the crystal is orthogonal to the first and second faces of the transducer piece.

24. The optical stress transducer of claim 18 further comprising retaining means for retaining said transducer piece and said first support piece in an assembly.

25. The optical stress transducer of claim 24 wherein the retaining means is adjustable for enabling precise alignment of the transducer piece relative to a direction of applied force.

26. A system for use in measuring high stresses applied at high loading rates with a time resolution of at least one microsecond, and having the ability to discern stress from nonhydrostatically applied loads, the system comprising:

an optical stress transducer comprising:
a transducer piece made of a luminescent crystalline material that exhibits a frequency shift in luminescent output as a function of stress, the transducer piece substantially comprising a single crystal within a detection area, said transducer piece being specifically positioned in a predetermined orientation relative to the direction of at least one applied force; the transducer piece having first and second faces which are substantially flat and parallel and adapted to receive applied force, the faces being separated by a thickness dimension which is substantially uniform over the faces of the transducer piece; the transducer piece also having at least one minimum lateral dimension which defines a minimum width across the faces of the transducer piece; said minimum lateral dimension being sufficient so that a strain rarefaction wave which propagates inwardly from an outer edge of the transducer piece during high stress conditions, does not reach the detection area of the transducer piece within a time period sufficient for information indicating stress to be detected from said detection area; and a first support piece having an inner face which is substantially flat and engages the transducer piece to apply an approximately uniform stress over the first face of the transducer piece;

a laser light source in optical communication with the detection area of the transducer piece to excite the detection area into a luminescent discharge;

beam splitting means for separating incident laser light and luminescent discharge from the detection area;

spectrometer means for spectrally dispersing the separated luminescent discharge; and high speed time resolving recording means for recording the spectrally dispersed luminescent discharge with a time resolution of at least one microsecond.

27. The optical stress transducer of claim 26 wherein the high speed time resolving recording means has a time resolution of at least 100 nanoseconds or faster.

28. The optical stress transducer of claim 26 wherein the high speed time resolving recording means has a time resolution of at least 50 nanoseconds or faster.

29. The optical stress transducer of claim 26 wherein the first support piece has an outer face which is substantially flat and parallel to said transducer faces.

30. The optical stress transducer of claim 26 wherein the minimum lateral dimension is at least three times said thickness dimension.

31. The optical stress transducer of claim 26 wherein the transducer piece and the first support piece are assembled together with the inner face of the first support piece being adjacent to the first face of the transducer piece.

32. The optical stress transducer of claim 26 wherein a principal crystallographic axis of the single crystal within the detection area is oriented normal to the first and second faces of the transducer piece.

33. The optical stress transducer of claim 26 wherein the single crystal is Z-cut and the C-axis of the crystal is orthogonal to the first and second faces of the transducer piece.

34. The optical stress transducer of claim 26 further comprising retaining means for retaining said transducer piece and said first support piece in an assembly.

35. The optical stress transducer of claim 34 wherein the retaining means is adjustable for enabling precise alignment of the transducer piece relative to an applied force.

36. The optical stress transducer of claim 26 wherein the laser light source is beamed through a focusing means to minimize the detection area stimulated by the laser light source.

37. A method for measuring high stresses applied at high loading rates by at least one applied force loading, comprising:

obtaining a transducer piece having opposing, substantially flat and parallel first and second faces; said transducer piece being made from a crystalline luminescent material which exhibits a frequency shift in luminescent output as a function of stress;

selecting a detection portion of said transducer piece which comprises substantially a single crystal structure; said detection portion of said transducer piece being sufficiently spaced inwardly from outer edges of the transducer piece so that a strain rarefaction wave generated from said outer edges during stressed conditions does not reach the detection portion within a time period sufficient for information indicating stress to be detected from said detection portion;

supporting the transducer piece between first and second support pieces having flat inner surfaces which bear on said first and second faces of the transducer piece;

positioning the transducer piece in a predetermined orientation with respect to a direction of at least one applied force loading;

stimulating the detection portion of the transducer piece with an appropriate optical beam so as to cause luminescent emissions to occur therefrom;

stressing the transducer piece by subjecting it to stressed conditions throughout the detection portion;

measuring the frequency of luminescent emissions occurring from the detection portion at least once during unstressed conditions and at least once during stressed conditions and prior to inpingement of said strain rarefaction wave upon said detection portion; and comparing differences in the luminescent emissions occurring during unstressed conditions and stressed conditions to achieve an indication of the stressed conditions existing in the transducer piece when the measuring step was performed.

* * * * *